US012761704B2

(12) United States Patent
Lin et al.

(10) Patent No.: US 12,761,704 B2
(45) Date of Patent: Oct. 13, 2026

(54) ELECTRONIC DEVICE

(71) Applicant: COMPAL ELECTRONICS, INC., Taipei City (TW)

(72) Inventors: Che-Hsien Lin, Taipei City (TW); Che-Hsien Chu, Taipei City (TW)

(73) Assignee: COMPAL ELECTRONICS, INC., Taipei City (TW)

( * ) Notice: Subject to any disclaimer, the term of this patent is extended or adjusted under 35 U.S.C. 154(b) by 67 days.

(21) Appl. No.: 19/061,957

(22) Filed: Feb. 24, 2025

(65) Prior Publication Data

US 2025/0278123 A1 Sep. 4, 2025

Related U.S. Application Data

(60) Provisional application No. 63/561,238, filed on Mar. 4, 2024.

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
None
See application file for complete search history.

(56) References Cited

U.S. PATENT DOCUMENTS

| | | | | |
|---|---|---|---|---|
| 2017/0147035 A1* | 5/2017 | Han | ...................... | G06F 1/1681 |
| 2019/0098839 A1* | 4/2019 | Kraus | ...................... | A01F 15/07 |
| 2019/0278338 A1* | 9/2019 | Siddiqui | ............... | G06F 1/1656 |
| 2020/0033916 A1* | 1/2020 | Aagaard | ............... | G06F 1/1681 |
| 2020/0133349 A1* | 4/2020 | Aagaard | ............... | G06F 1/1681 |
| 2023/0295895 A1* | 9/2023 | Jamilosa | ............... | E02F 3/3677 414/691 |
| 2023/0421672 A1* | 12/2023 | Wendt | ................... | G06F 1/1679 |

FOREIGN PATENT DOCUMENTS

| | | |
|---|---|---|
| CN | 111835974 | 10/2020 |
| TW | 1739580 | 9/2021 |

* cited by examiner

*Primary Examiner* — Xanthia C Relford
(74) *Attorney, Agent, or Firm* — JCIPRNET

(57) ABSTRACT

An electronic device including a first body, a second body and at least one pivot module is provided. The pivot module includes a first transmission wheel, a linkage assembly, a first sliding member, a first driven member and a first rope. The linkage assembly is connected to the first body and the second body. The first sliding member is connected to the first body and linked to the first transmission wheel. The first driven member is connected to the first transmission wheel and the linkage assembly. The first rope is connected to the first sliding member and the first transmission wheel. The rotation of the first body drives the first driven member and the linkage assembly to move, thereby driving the first transmission wheel to rotate, so as to drive the first sliding member and at least part of the first body to slide relative to the linkage assembly.

18 Claims, 12 Drawing Sheets

M1

ELECTRONIC DEVICE

CROSS-REFERENCE TO RELATED APPLICATION

This application claims the priority benefit of U.S. provisional application Ser. No. 63/561,238, filed on Mar. 4, 2024. The entirety of the above-mentioned patent application is hereby incorporated by reference herein and made a part of this specification.

BACKGROUND

Technical Field

The disclosure relates to an electronic device.

Description of Related Art

The modern electronic device includes two bodies and a pivot, with the two bodies rotatably connected through the pivot. When the two bodies are relatively flipped, there is a gap between the two bodies due to the structural limitations of the pivot, that is unfavorable for users to view and use the electronic device.

SUMMARY

The disclosure provides an electronic device that is convenient to use.

The electronic device of the disclosure includes a first body, a second body and at least one pivot module. The first body is pivotably connected to the second body. The pivot module includes a first transmission wheel, a linkage assembly, a first sliding member, a first driven member and a first rope. The linkage assembly is connected to the first body and the second body. The first sliding member is connected to the first body and linked to the first transmission wheel. The first driven member is connected to the first transmission wheel and the linkage assembly. The first rope is connected to the first sliding member and the first transmission wheel. The rotation of the first body relative to the second body drives the first driven member and the linkage assembly to move, thereby driving the first transmission wheel to rotate. The rotation of the first transmission wheel relative to the first rope drives the first sliding member and at least part of the first body to slide relative to a central axis of the linkage assembly.

Based on the above, the first body of the electronic device of the disclosure is connected to the linkage assembly of the pivot module. When the first body rotates, the first body leads the first transmission wheel to rotate through the first driven member and the linkage assembly, and the first transmission wheel drives the first sliding member to slide through the first rope. Thereby, at least part of the first body connected to the first sliding member slides relative to the center axis of the linkage assembly while the first body rotates relative to the second body, to improve the convenience of using the electronic device.

DESCRIPTION OF THE EMBODIMENTS

Figure 1:
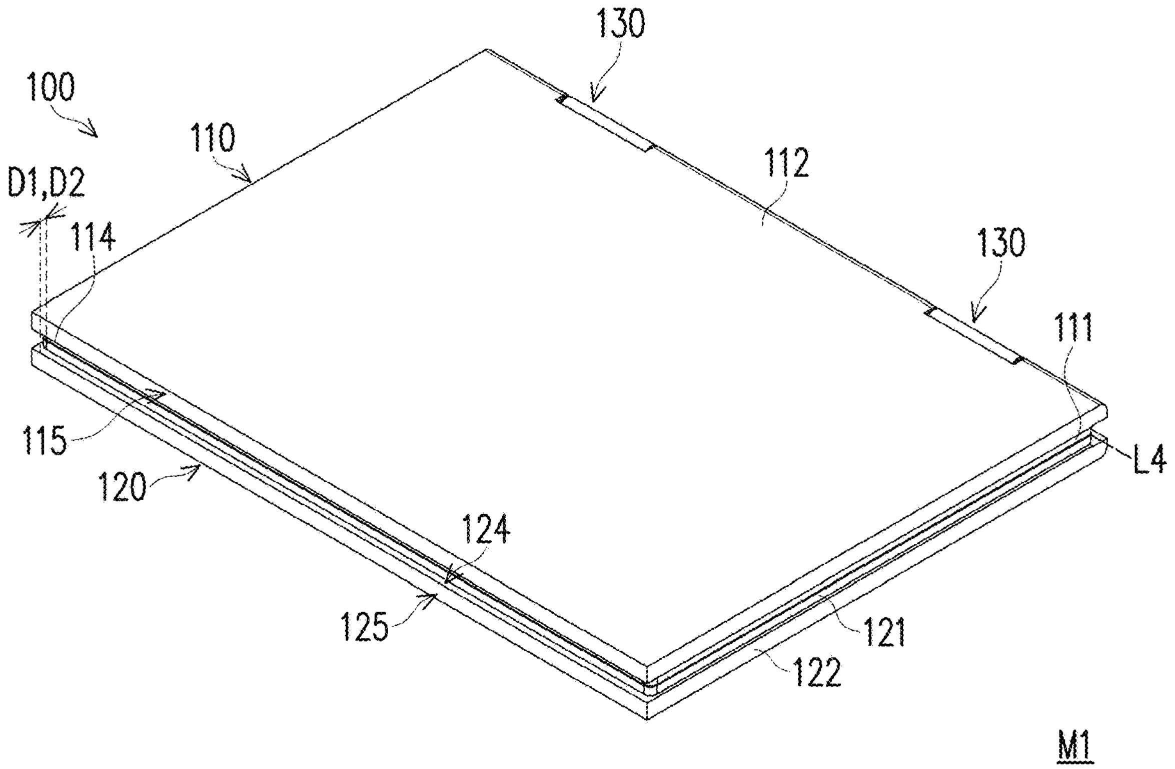
FIG. 1 is a schematic diagram of an electronic device according to an embodiment of the disclosure.
Figure 2:
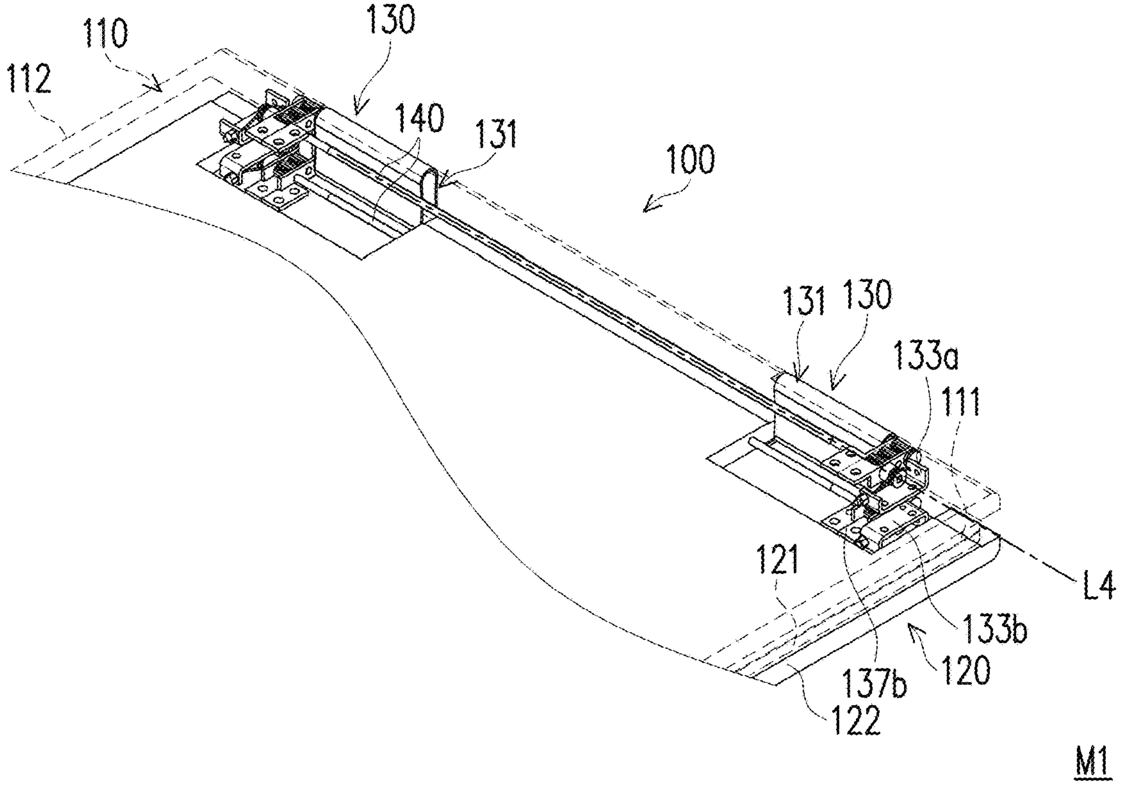
FIG. 2 is another schematic diagram of the electronic device in FIG. 1.
Figure 3:
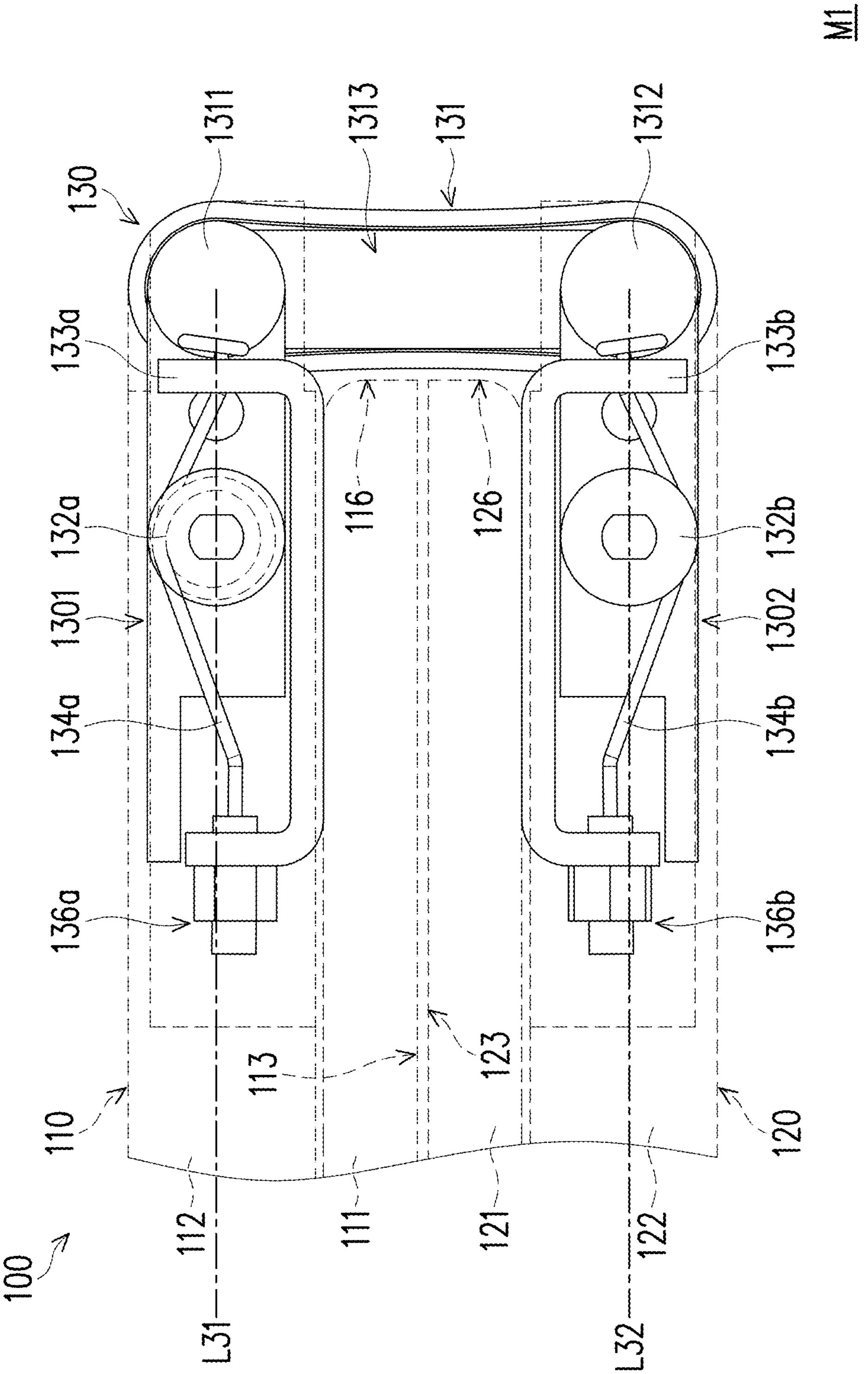
FIG. 3 is a side view of the electronic device in FIG. 1.
Figure 4:
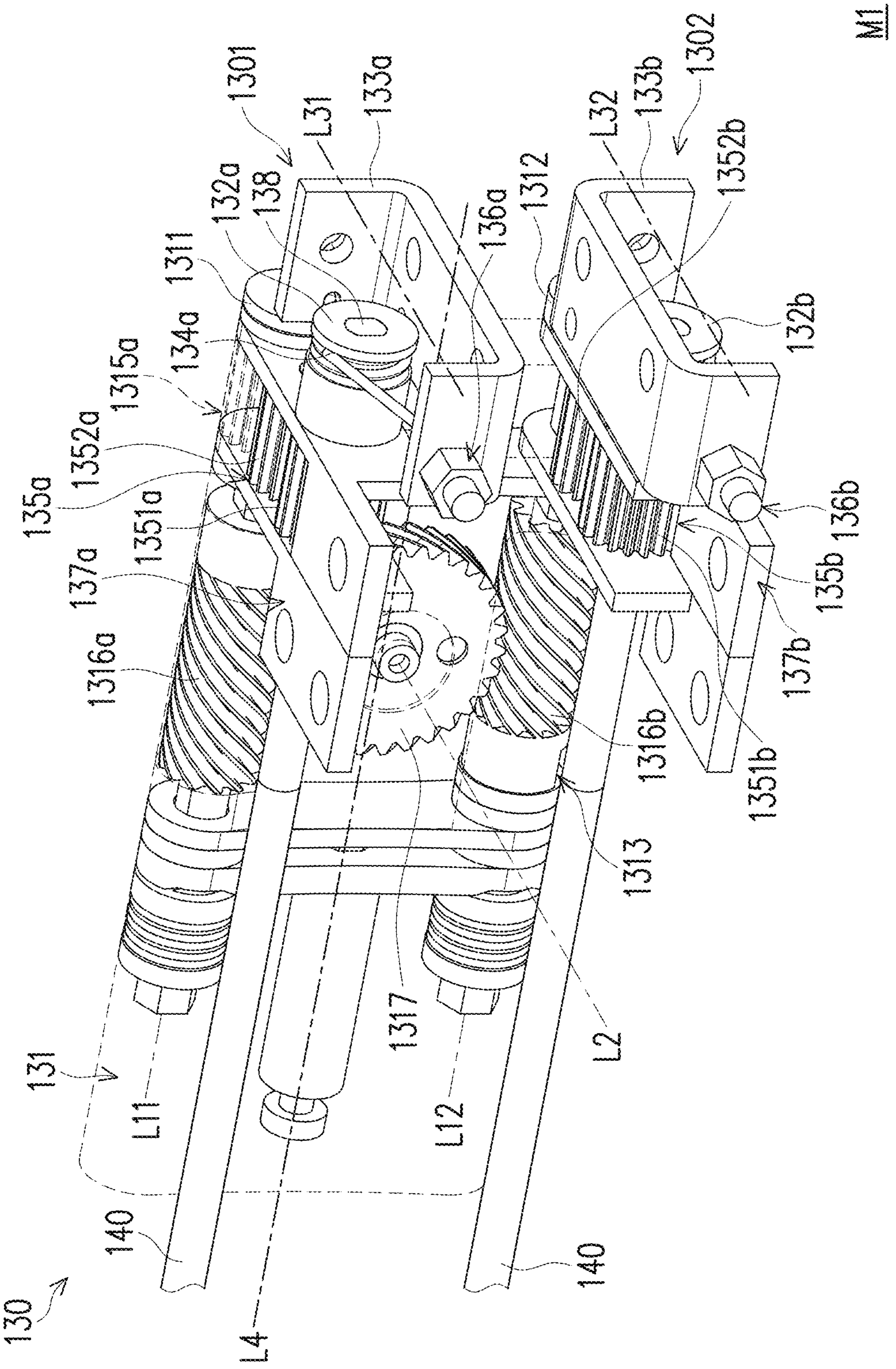
FIG. 4 is a schematic diagram of the pivot module in FIG. 2.
Figure 5:
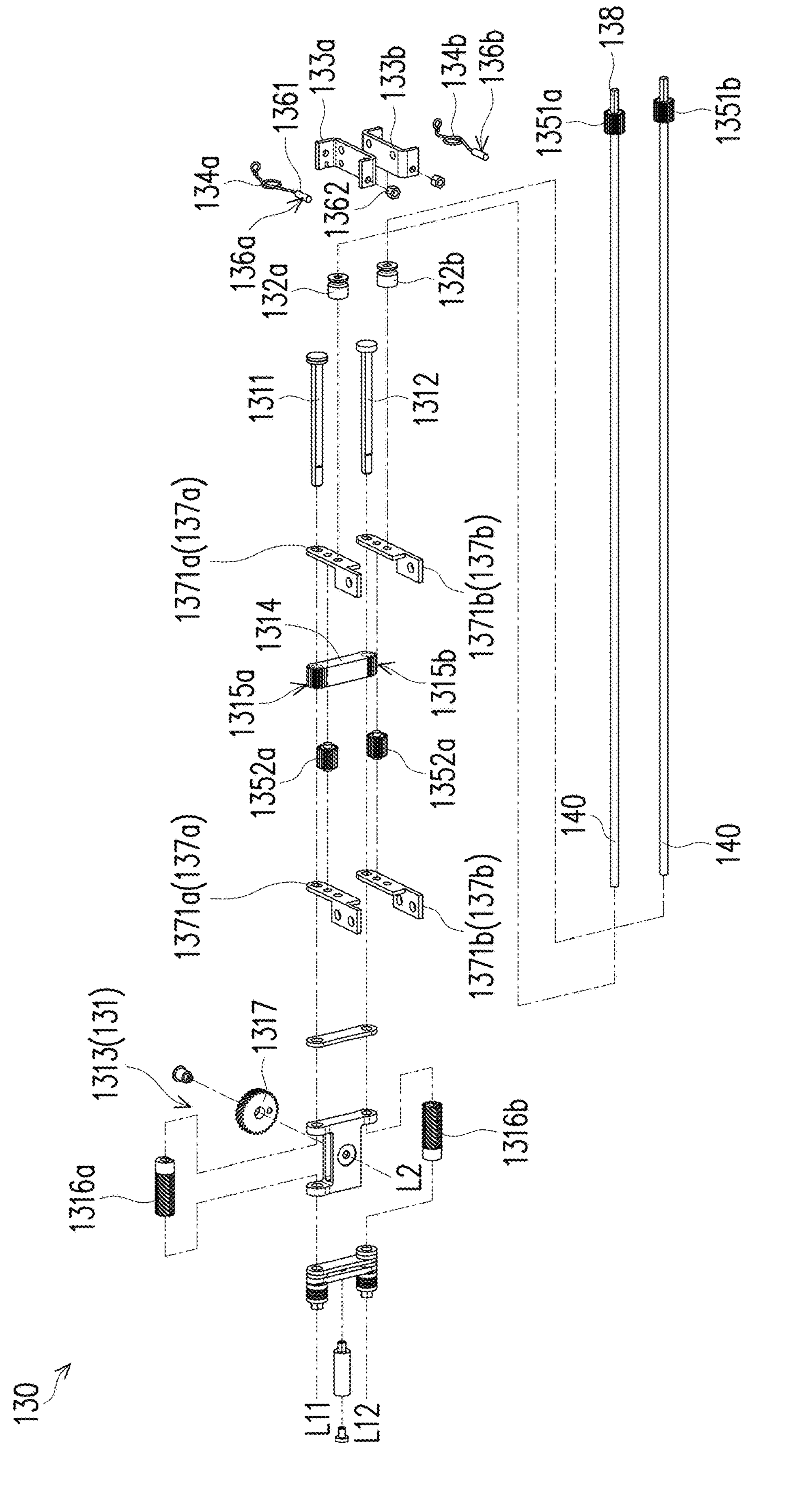
FIG. 5 is an exploded view of the pivot module in FIG. 4.

FIG. 1 is a schematic diagram of an electronic device according to an embodiment of the disclosure. FIG. 2 is another schematic diagram of the electronic device in FIG. 1. FIG. 3 is a side view of the electronic device in FIG. 1. FIG. 4 is a schematic diagram of the pivot module in FIG. 2. FIG. 5 is an exploded view of the pivot module in FIG. 4. Please refer to FIG. 1 to FIG. 5 at the same time, the electronic device 100 includes a first body 110, a second body 120, and at least one pivot module 130. The first body 110 is pivotally connected to the second body 120 through the pivot module 130. Each pivot module 130 includes a first driving assembly 1301 and a linkage assembly 131. The linkage assembly 131 is connected to the first body 110 and the second body 120. The first driving assembly 1301 of the pivot module 130 includes a first transmission wheel 132*a*, a first sliding member 133*a*, a first driven member 135*a*, and a first rope 134*a*. The first driven member 135*a* is connected to the first transmission wheel 132*a* and the linkage assembly 131. The first rope 134*a* is connected to the first sliding member 133*a* and the first transmission wheel 132*a*. The first sliding member 133*a* is connected to the first body 110, and is linked to the first transmission wheel 132*a* through the first rope 134*a*.

The rotation of the first body 110 relative to the second body 120 leads the first driven member 135*a* and the linkage assembly 131 to move, thereby driving the first transmission wheel 132*a* to rotate. The rotation of the first transmission wheel 132*a* relative to the first rope 134*a* drives the first sliding member 133*a* and at least part of the first body 110 to slide relative to the second body 120. Thereby, a first function module 111 of the first body 110 may slide relative to a center axis L4 of the linkage assembly 131 and a second function module 121 of the second body 120 through the first driving assembly 1301 while rotating. The electronic device 100 may switch between a first status M1 (shown in FIG. 1) and a second status M2 (shown in FIG. 6) to improve the convenience of use of the electronic device 100. The number of pivot modules 130 in this embodiment is two, but not limited thereto. The electronic device 100 includes a linkage rod 140, and the two pivot modules 130 are connected by the linkage rod 140, so that the two pivot modules

130 may act synchronously and stably. The first function module 111 and the second function module 121 may include an input module (for example, a keyboard) and/or a display module, but not limited thereto.

As shown in FIG. 1 to FIG. 3, the first body 110 of this embodiment further includes a first casing 112, and the first function module 111 is slidably disposed on the first casing 112, but not limited thereto. The first sliding member 133*a* is connected to the first function module 111, and may lead the first function module 111 to slide relative to the first casing 112 along a sliding axis L31. The second body 120 of this embodiment includes a second casing 122, and the second function module 121 of the second body 120 is slidably disposed on the second casing 122, but not limited thereto.

As shown in FIG. 3 to FIG. 5, the linkage assembly 131 includes a first shaft 1311, a second shaft 1312, a linkage portion 1313, a connecting member 1314, and a first rack structure 1315*a*. The first shaft 1311 is linked to the second shaft 1312 through the linkage portion 1313. The first shaft 1311 is linked to the first casing 112 of the first body 110, and the second shaft 1312 is linked to the second casing 122 of the second body 120. The first shaft 1311 and the second shaft 1312 are movably sleeved on opposite ends of the connecting member 1314 respectively. The first rack structure 1315*a* is formed on the end of the connecting member 1314 adjacent to the first shaft 1311. The first shaft 1311 and the second shaft 1312 may rotate relative to the connecting member 1314. The first driven member 135*a* is connected to the first shaft 1311 and the first transmission wheel 132*a*, so that the first transmission wheel 132*a* is linked to the first shaft 1311.

The linkage portion 1313 of this embodiment includes two main shaft gears 1316*a*, 1316*b* and a linkage gear 1317. The two main shaft gears 1316*a*, 1316*b* are sleeved on the first shaft 1311 and the second shaft 1312 along the corresponding two main axes L11, L12 respectively. The linkage gear 1317 is disposed between the two main shaft gears 1316*a*, 1316*b* along a connecting axis L2 and engages with the two main shaft gears 1316*a*, 1316*b*. The two main axes L11, L12 are parallel to each other, and the connecting axis L2 and the sliding axis L31 are perpendicular to the two main axes L11, L12. The center axis L4 of the linkage assembly 131 is intersected with and is perpendicular to the connecting axis L2.

The linkage assembly 131 further includes a first bracket 137*a* and a second bracket 137*b*. The first bracket 137*a* is connected to the first casing 112 of the first body 110 and includes two components 1371*a*. The second bracket 137*b* is connected to the second casing 122 of the second body 120 and includes two components 1371*b*. The first shaft 1311 is fixedly connected to the first bracket 137*a*, and may move with the first bracket 137*a*. The first driven member 135*a* and the connecting member 1314 (the first rack structure 1315*a*) are rotatably connected to the first bracket 137*a*, and are located between the two components 1371*a*. The second shaft 1312 is fixedly connected to the second bracket 137*b*, and may move with the second shaft 1312.

When the first body 110 (the first bracket 137*a*) rotates relative to the second body 120, the first shaft 1311 is driven to rotate the main shaft gear 1316*a*, thereby driving the linkage gear 1317 to rotate, which in turn drives the main shaft gear 1316*b* to rotate, and leading to the rotation of the second shaft 1312 (the second bracket 137*b*). The second body 120 is driven by the linkage assembly 131 to rotate relative to the first body 110. The first shaft 1311 and the second shaft 1312 may rotate in opposite directions from each other. For example, when the first shaft 1311 is rotated in a clockwise direction, the second shaft 1312 is rotated in a counterclockwise direction. The linkage way of the first shaft 1311 and the second shaft 1312 (i.e., the structure of the linkage assembly 131) is not limited to this embodiment.

As shown in FIG. 4 and FIG. 5, the first driven member 135*a* includes a plurality of gears. In this embodiment, the number of gears is two, but not limited thereto. The two gears 1351*a*, 1352*a* are engaged with each other. A rod 138 of the gear 1351*a* is connected to the first transmission wheel 132*a*, and the gear 1352*a* is engaged with the first rack structure 1315*a* of the linkage assembly 131. In this embodiment, the number of teeth of the two gears 1351*a*, 1352*a* is the same, but not limited thereto. In an embodiment not shown, the number of teeth of the two gears 1351*a*, 1352*a* may be different, to adjust the moving distance of the first sliding member 133*a* on the sliding axis L31 by the ratio of the number of teeth of the two gears 1351*a*, 1352*a*. The linkage rod 140 may be connected to the gear 1351*a*. In an embodiment not shown, the number of gears of the first driven member 135*a* may be three, four, or any arbitrary number. In an embodiment not shown, the number of gears of the first driven member 135*a* may be one, and the gear may be connected to the first transmission wheel 132*a* and the linkage rod 140, and engaged with the first rack structure 1315*a*.

As shown in FIG. 3, the first rope 134*a* winds around at least part of the first transmission wheel 132*a*. In this embodiment, the first rope 134*a* winds around the entire first transmission wheel 132*a*, in other words, the number of turns of the first rope 134*a* winding around the first transmission wheel 132*a* is one turn, but not limited thereto. By adjusting the number of turns of the first rope 134*a*, the contact area between the first rope 134*a* and the first transmission wheel 132*a* may be adjusted, thereby adjusting the friction between the first rope 134*a* and the first transmission wheel 132*a*. The first rope 134*a* starts winding around the first transmission wheel 132*a* from the edge farther from the first function module 111, and after winding one turn, the first rope 134*a* leaves the first transmission wheel 132*a* from the same edge of the first transmission wheel 132*a*, but not limited thereto.

The winding way and the number of turns of the first rope 134*a* are not limited to this embodiment. In an embodiment not shown, the first rope 134*a* may only abut against a part of the first transmission wheel 132*a*. That is, the number of turns of the first rope 134*a* may be less than one turn. In an embodiment not shown, the number of turns of the first rope 134*a* may be greater than one turn. In an embodiment not shown, the first rope 134*a* may start winding around the first transmission wheel 132*a* from the edge closer to the first function module 111, and leave the first transmission wheel 132*a* from the same edge of the first transmission wheel 132*a*.

The first driving assembly 1301 of the pivot module 130 further includes a first adjustment member 136*a*. The shape of the first sliding member 133*a* is, for example, U-shaped, but not limited thereto. One end of the first rope 134*a* is fixed to the first sliding member 133*a*, and the other end is connected to the first adjustment member 136*a*. The first adjustment member 136*a* is used to adjust the friction between the first transmission wheel 132*a* and the first rope 134*a*. Even if the friction between the first transmission wheel 132*a* and the first rope 134*a* decreases due to long-term use, the first rope 134*a* may be maintained in a tightened state through the first adjustment member 136*a*, thereby maintaining the certain friction between the first transmission wheel 132*a* and the first rope 134*a*, allowing the first transmission wheel 132*a* to rotate and displace stably. The first adjustment member 136*a* includes, for example, a stick 1361 and a nut 1362, but not limited thereto. The stick 1361 is connected to the first rope 134*a* and the first sliding member 133*a*. The nut 1362 is movably connected to the stick 1361, and the movement of the nut 1362 relative to the stick 1361 may adjust the relative position between the stick 1361 and the first sliding member 133*a*.

As shown in FIG. 3 to FIG. 5, the pivot module 130 of this embodiment further includes a second driving assembly 1302. The second driving assembly 1302 has a structure similar to the first driving assembly 1301. Specifically, the second driving assembly 1302 of the pivot module 130 includes a second transmission wheel 132*b*, a second sliding member 133*b*, a second rope 134*b*, a second driven member 135*b*, and a second adjustment member 136*b*. The linkage assembly 131 further includes a second rack structure 1315*b*, the second rack structure 1315*b* is formed on the other end of the connecting member 1314 near the second shaft 1312. The second sliding member 133*b* is connected to the second function module 121 of the second body 120, and may lead the second function module 121 to slide relative to the second casing 122 along the sliding axis L31.

The second driven member 135*b* is connected to the second transmission wheel 132*b* and the second shaft 1312 of the linkage assembly 131, thereby linking the second transmission wheel 132*b* to the second shaft 1312. The second driven member 135*b* includes two gears 1351*b*, 1352*b*. The gears 1351*b*, 1352*b* are engaged with each other. The gear 1351*b* is connected to the second transmission wheel 132*b*, and the gear 1352*b* is engaged with the second rack structure 1315*b*. The linkage rod 140 is connected to the gear 1351*b*. The second sliding member 133*b* is linked to the second transmission wheel 132*b*. One end of the second rope 134*b* is fixedly connected to the second sliding member 133*b*, and the other end is connected to the second adjustment member 136*b*. The second rope 134*b* surrounds and connects to the second transmission wheel 132*b*. The second driven member 135*b* and the connecting member 1314 (the second rack structure 1315*b*) are rotatably connected to the second bracket 137*b* and located between the two components 1371*b*.

The rotation of the first body 110 relative to the second body 120 leads the linkage assembly 131 to move, thereby driving the second body 120 to rotate relative to the first body 110, and leading the second driven member 135*b* to drive the second transmission wheel 132*b* to rotate. The rotation of the second transmission wheel 132*b* relative to the second rope 134*b* drives the second sliding member 133*b* and the second function module 121 of the second body 120 to slide along the sliding axis L32 relative to the first body 110. The two sliding axes L31, L32 are parallel to each other.

FIG. 1 to FIG. 4 shown the electronic device 100 in the first status M1. In the first status M1, a first outer surface 113 of the first function module 111 of the first body 110 faces towards a second outer surface 123 of the second function module 121 of the second body 120, the first body 110 is parallel to the second body 120, and the electronic device 100 is closed. A projection of the first function module 111 to the first casing 112 is completely located on the first casing 112, and a projection of the linkage assembly 131 to the first casing 112 is completely located on the first casing 112. There is a distance D1 between an end 114 of the first function module 111 and an end 115 of the first casing 112. In this embodiment, the distance D1 is greater than zero, but not limited thereto.

A projection of the second function module 121 to the second casing 122 is completely located on the second casing 122, and a projection of the linkage assembly 131 to the second casing 122 is completely located on the second casing 122. There is a distance D2 between an end 124 of the second function module 121 and an end 125 of the second casing 122. The distance D1 is equal to the distance D2, but not limited thereto. The first sliding member 133*a* and the second sliding member 133*b* are in the position shown in FIG. 4. The sliding axes L31, L32 are parallel to the connecting axis L2.

Figure 6:
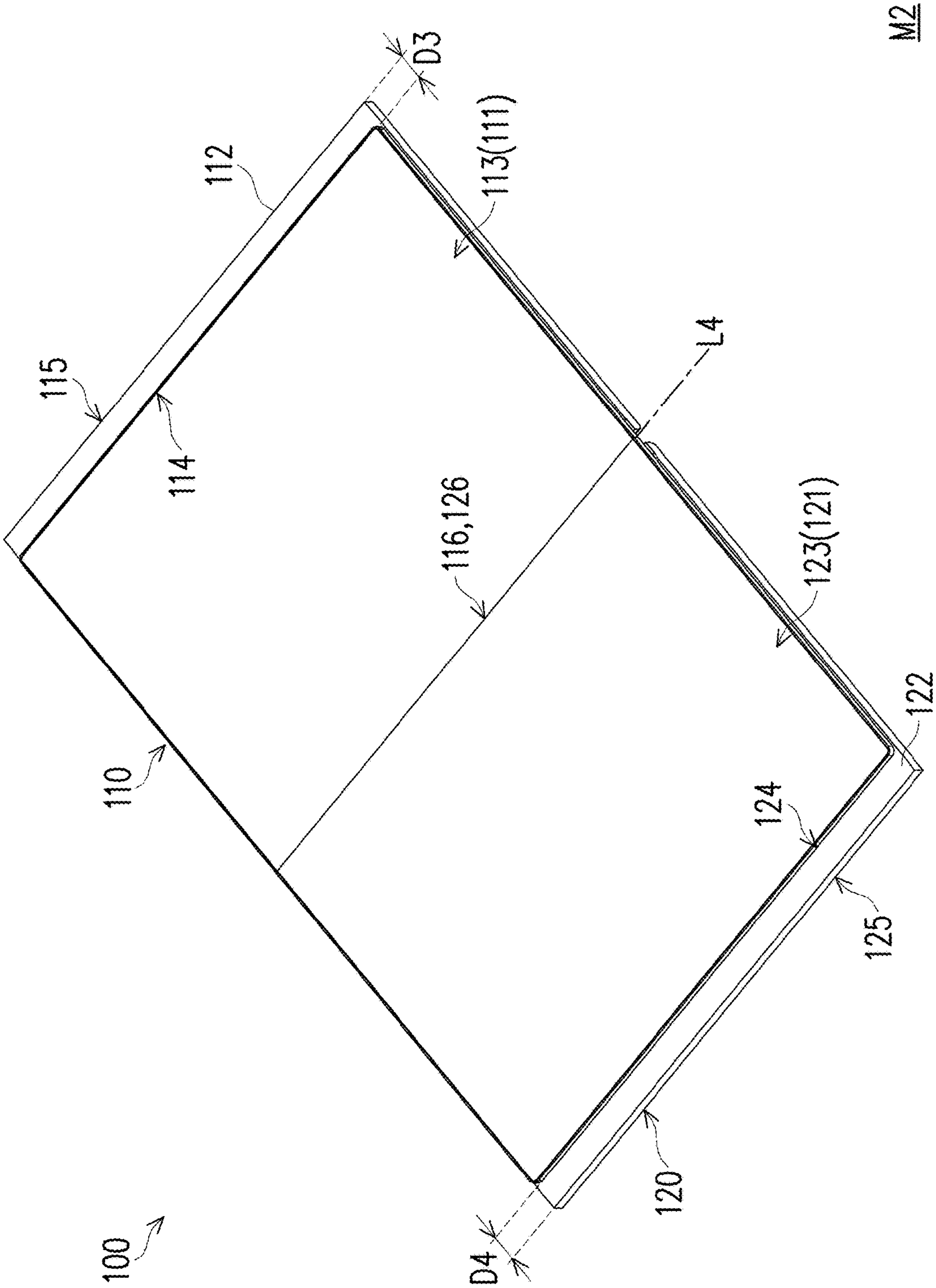
FIG. 6 is a schematic diagram of the electronic device in FIG. 1 in the second status.
Figure 7:
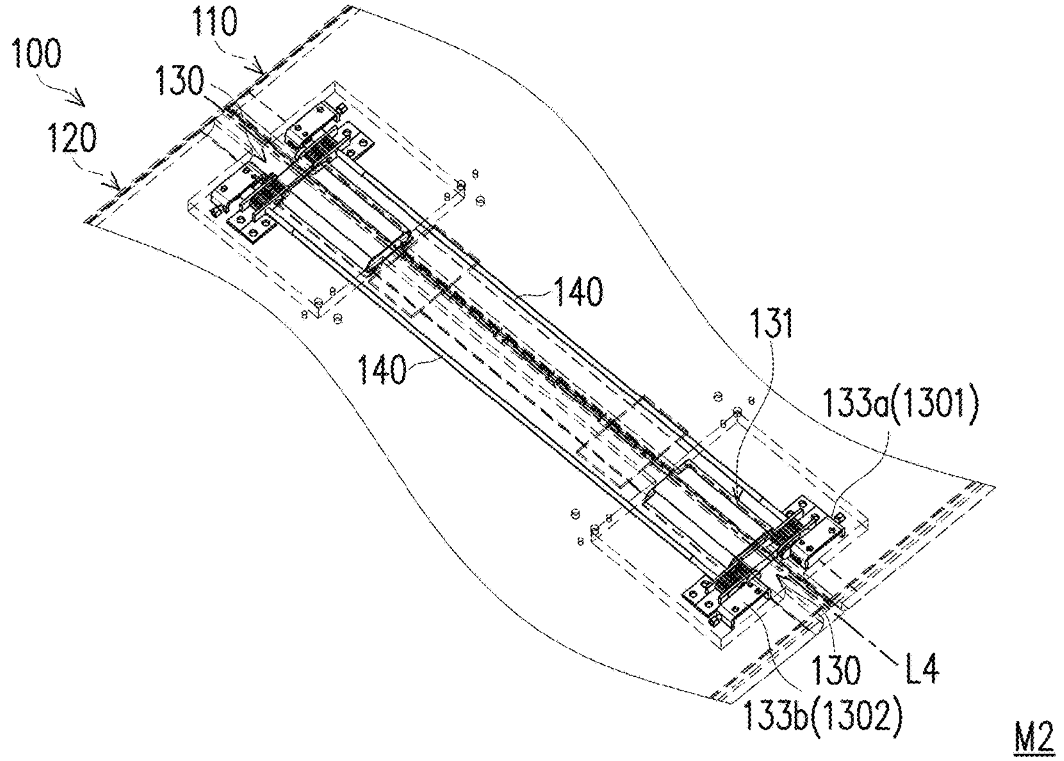
FIG. 7 is a partially enlarged view of the electronic device in FIG. 6.
Figure 8:
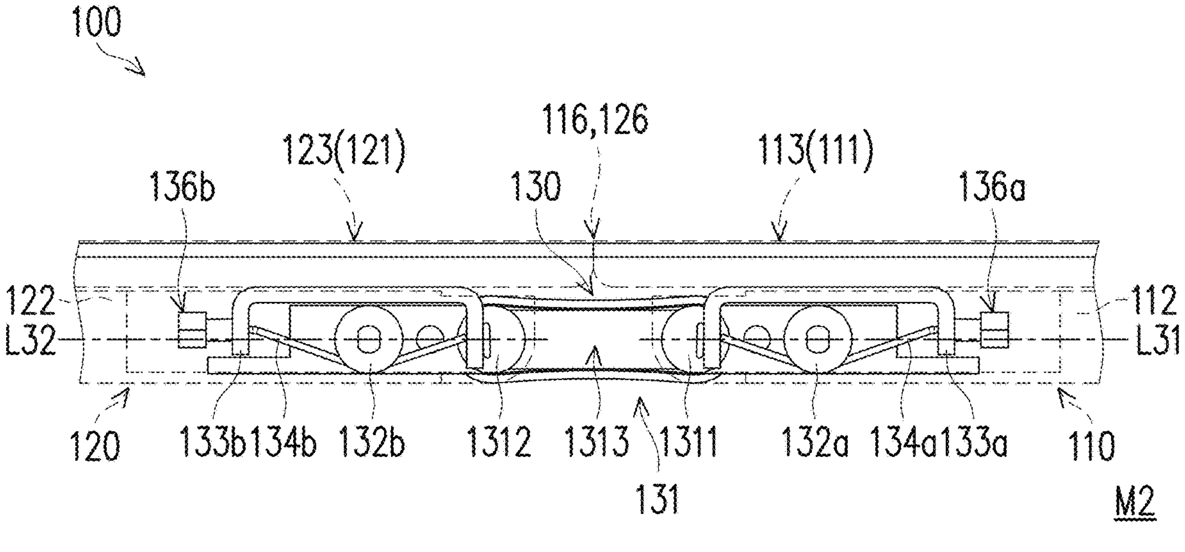
FIG. 8 is a side view of the electronic device in FIG. 6.
Figure 9:
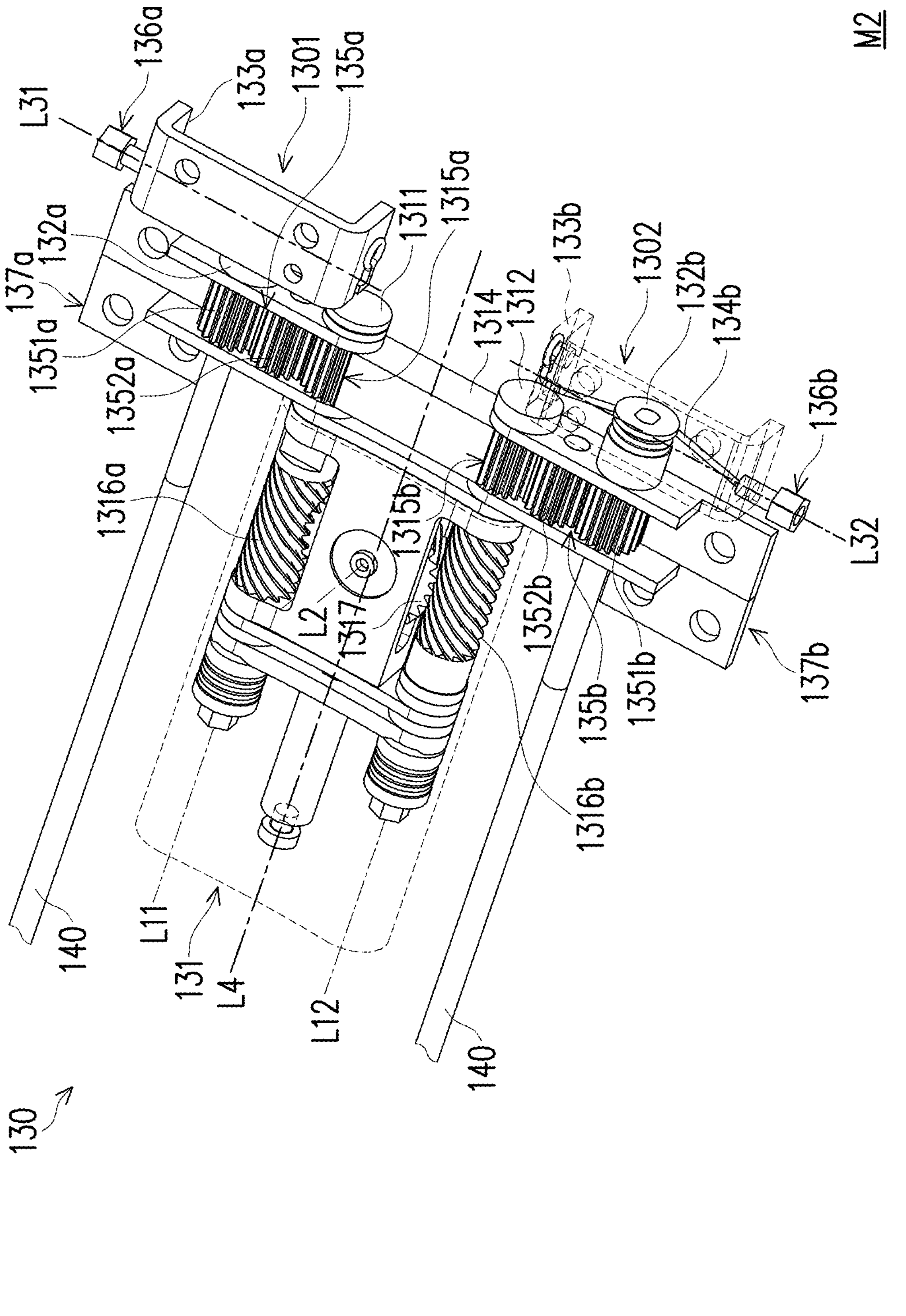
FIG. 9 is a schematic diagram of the pivot module in FIG. 7.

FIG. 6 is a schematic diagram of the electronic device in FIG. 1 in the second status. FIG. 7 is a partially enlarged view of the electronic device in FIG. 6. FIG. 8 is a side view of the electronic device in FIG. 6. FIG. 9 is a schematic diagram of the pivot module in FIG. 7. Please refer to FIG. 6 to FIG. 9 at the same time. When switching the electronic device 100 from the first status M1 to the second status M2, the first body 110 (the first bracket 137*a*) may be forced to rotate relative to the second body 120, thereby leading the first shaft 1311 to rotate. The first driving assembly 1301 (i.e., the first transmission wheel 132*a*, the first sliding member 133*a*, the first rope 134*b*, the first driven member 135*a*, and the first adjustment member 136*a*) is led by the first bracket 137*a* to rotate relative to the first rack structure 1315*a* of the linkage assembly 131 with the main axis L11 as the axis.

Since the gear 1352*a* of the first driven member 135*a* is engaged with the first rack structure 1315*a*, the rotation of the first driving assembly 1301 causes the gear 1352*a* to rotate relative to the first rack structure 1315*a* and the first bracket 137*a*, thereby driving the gear 1351*a* to rotate. The first transmission wheel 132*a* is led by the gear 1351*a* to rotate relative to the first rope 134*a*, to drive the first sliding member 133*a* to lead the first function module 111 of the first body 110 to slide relative to the first casing 112 along the sliding axis L31.

During the rotation process of the first shaft 1311, the second shaft 1312 is led by the first shaft 1311 through the linkage portion 1313, causing the second body 120 (the second bracket 137*b*) to rotate relative to the first body 110. The second driving assembly 1302 (i.e., the second transmission wheel 132*b*, the second sliding member 133*b*, the second rope 134*b*, the second driven member 135*b*, and the second adjustment member 136*b*) is led by the second bracket 137*b* to rotate relative to the second rack structure 1315*b*. Thereby, the gears 1351*b*, 1352*b* of the second driven member 135*b* are led by the second rack structure 1315*b* to drive the second transmission wheel 132*b* to rotate relative to the second rope 134*b*, causing the second sliding member 133*b* to lead the second function module 121 of the second body 120 to slide relative to the second casing 122 along the sliding axis L32. The first function module 111 and the second function module 121 move closer to each other.

The first body 110 continues to be forced until the first body 110 and the second body 120 relatively move to the position shown in FIG. 6. The electronic device 100 switches to the second status M2. In the second status M2, the angle between the first function module 111 and the second function module 121 is 180 degrees, but not limited thereto. An edge 116 of the first outer surface 113 of the first function module 111 is closely attached to an edge 126 of the second outer surface 123 of the second function module 121, to increase the continuity of the first outer surface 113 and the second outer surface 123. The projection of the first function module 111 to the first casing 112 is partially located on the first casing 112, and the projection of the second function module 121 to the second casing 122 is partially located within the second casing 122. The first function module 111 and the second function module 121 jointly cover the pivot module 130 from the viewing angle in FIG. 6. The distance D3 between the end 114 of the first function module 111 and the end 115 of the first casing 112 is greater than the distance D1 (shown in FIG. 1) in the first status M1. The distance D4 between the end 124 of the second function module 121 and the end 125 of the second casing 122 is greater than the distance D2 (shown in FIG. 1) in the first status M1. The distance D3 is equal to the distance D4, but not limited thereto. The two sliding axes L31, L32 are perpendicular to the connecting axis L2.

When switching the electronic device 100 from the second status M2 to the first status M1, the first body 110 is forced to rotate towards the second body 120. The first body 110 leads the first driving assembly 1301 and the linkage assembly 131 to move, causing the first function module 111 and the first casing 112 to rotate, and the first function module 111 to slide relative to the first casing 112. Simultaneously, the linkage assembly 131 drives the second driving assembly 1302 to move, causing the second function module 121 and the second casing 122 to rotate, and the second function module 121 to slide relative to the second casing 122. Thereby, the electronic device 100 moves from the position shown in FIG. 8 (the second status M2) to the position shown in FIG. 3 (the first status M1).

It can be understood that during the switching process of the electronic device 100 between the first status M1 and the second status M2, the first body 110 (the first function module 111 and the first casing 112) rotates with the main axis L11 as the axis, and the first function module 111 slides relative to the first casing 112 along the sliding axis L31. The second body 120 (the second function module 121 and the second casing 122) rotates with the main axis L12 as the axis, and the second function module 121 slides relative to the second casing 122 along the sliding axis L32.

Figure 10A:
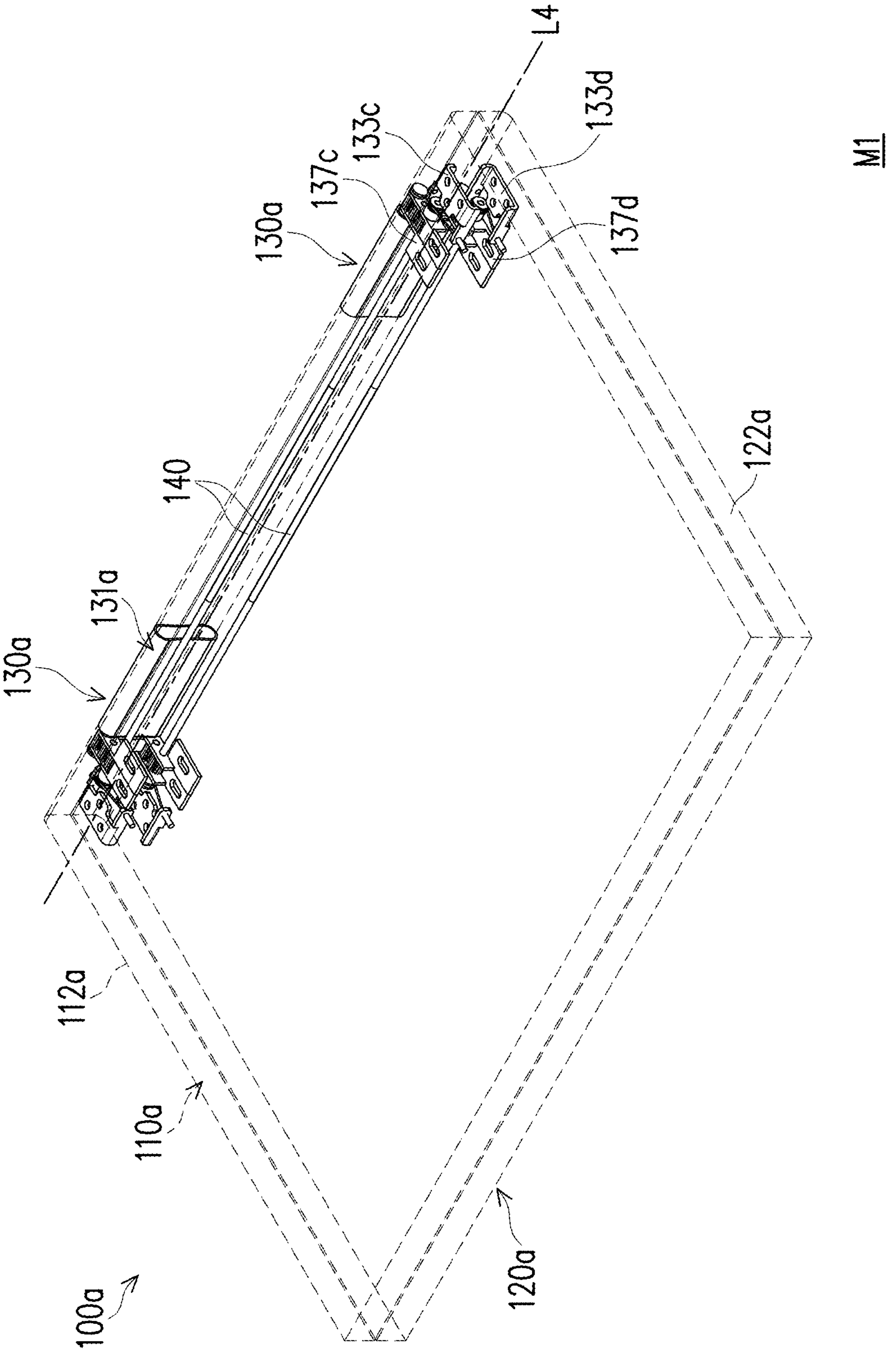
FIG. 10A is a schematic diagram of an electronic device in the first status according to another embodiment of the disclosure.
Figure 10B:
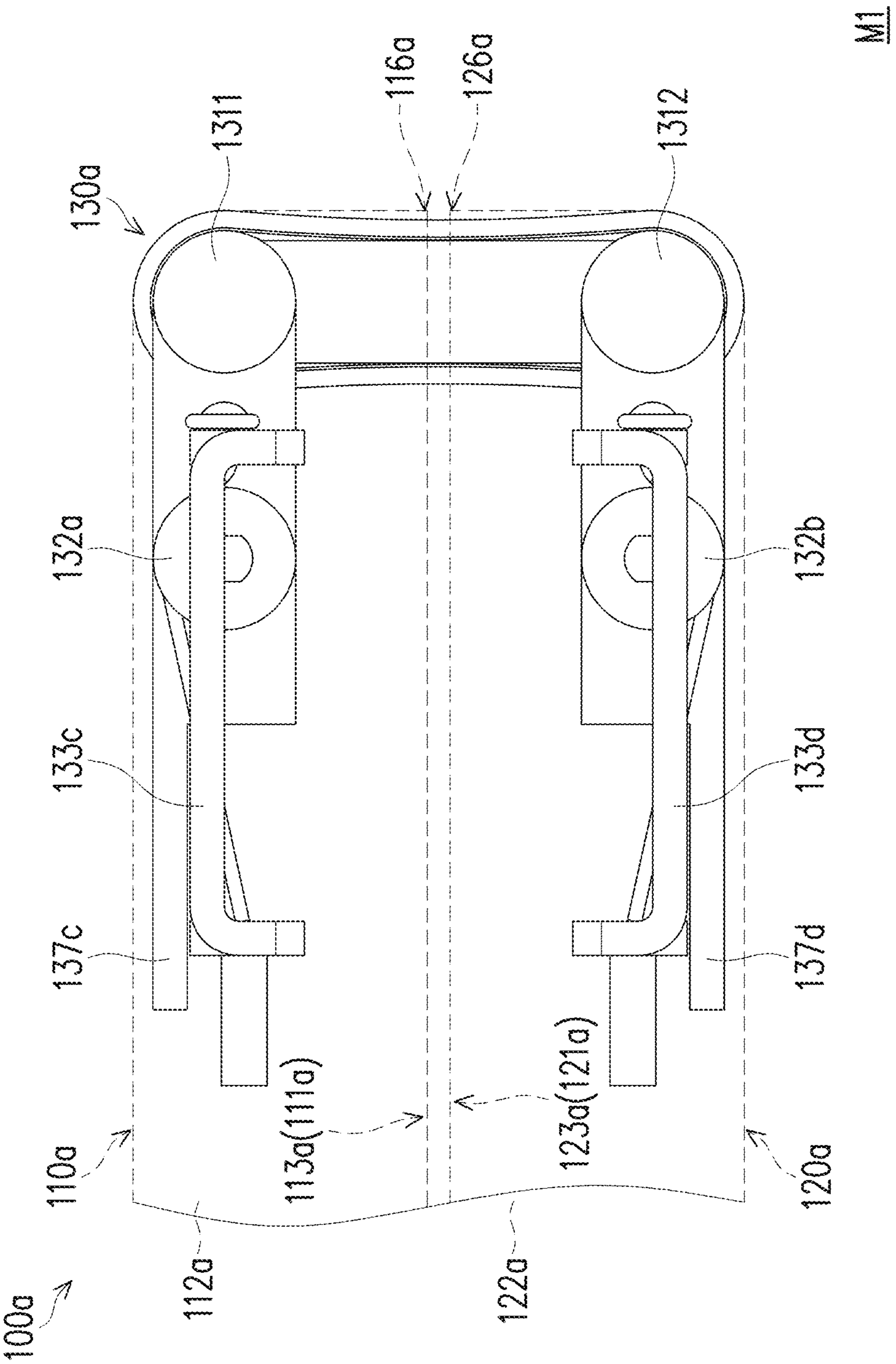
FIG. 10B is a side view of the electronic device in FIG. 10A.
Figure 11:
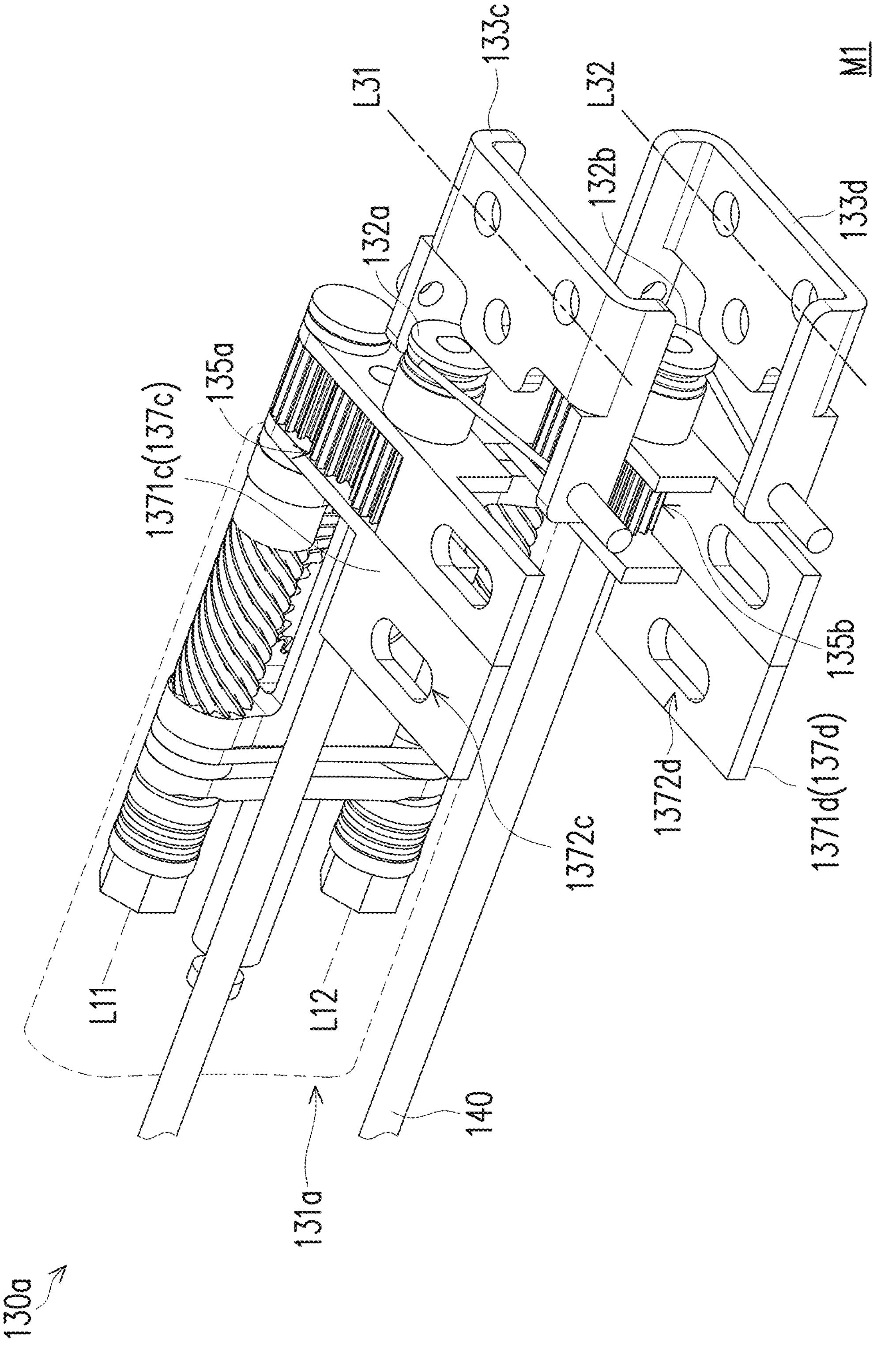
FIG. 11 is a schematic diagram of the pivot module in FIG. 10A.
Figure 12A:
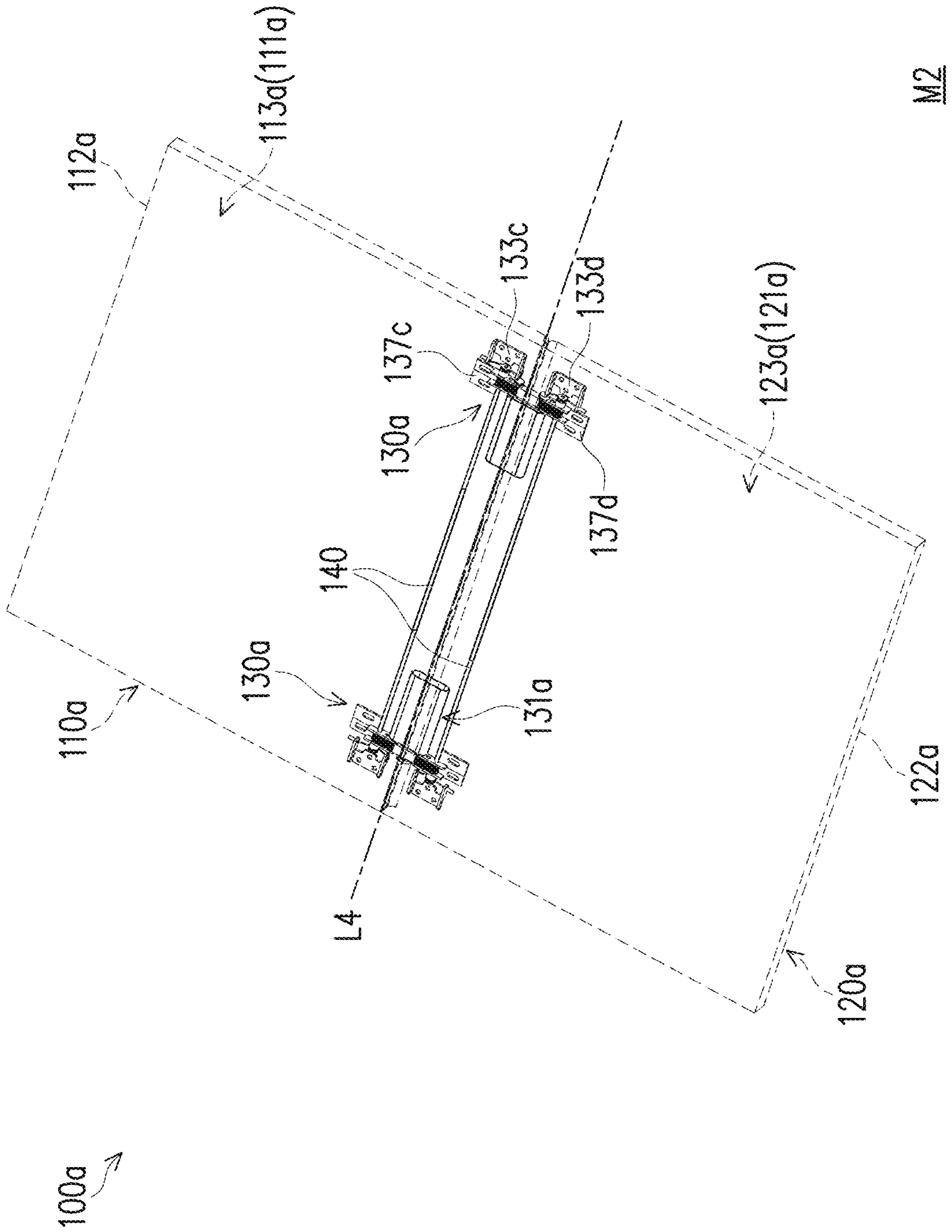
FIG. 12A is a schematic diagram of the electronic device in FIG. 10A in the second status.
Figure 12B:
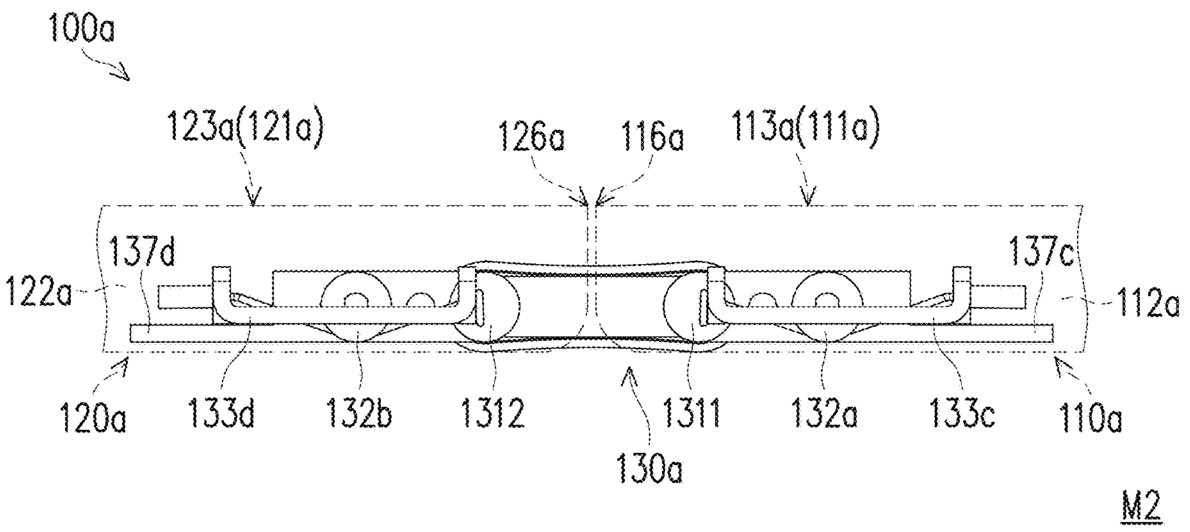
FIG. 12B is a side view of the electronic device in FIG. 12A.
Figure 13:
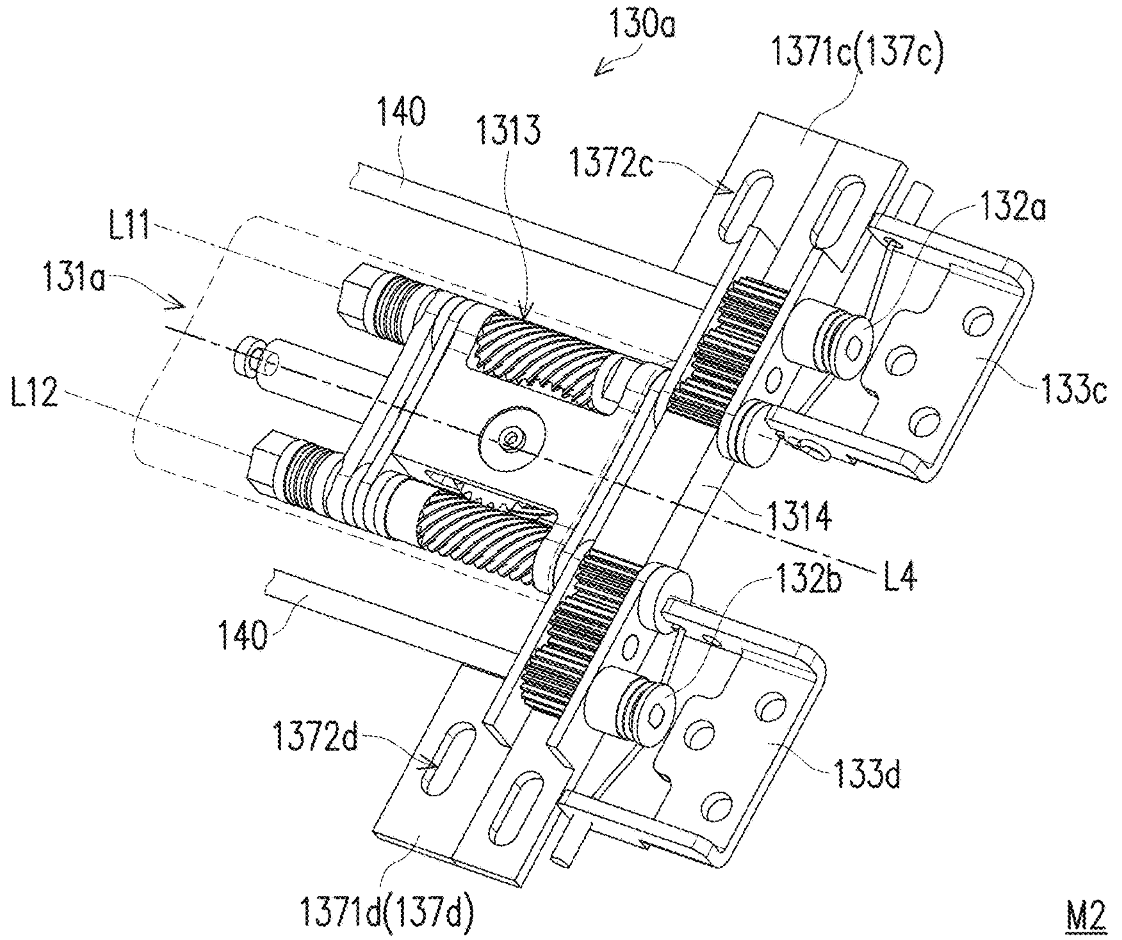
FIG. 13 is a schematic diagram of the pivot module in FIG. 12A.

FIG. 10A is a schematic diagram of an electronic device in the first status according to another embodiment of the disclosure. FIG. 10B is a side view of the electronic device in FIG. 10A. FIG. 11 is a schematic diagram of the pivot module in FIG. 10A. FIG. 12A is a schematic diagram of the electronic device in FIG. 10A in a second status. FIG. 12B is a side view of the electronic device in FIG. 12A. FIG. 13 is a schematic diagram of the pivot module in FIG. 12A. Please refer to FIG. 2 and FIG. 10A to FIG. 13 at the same time, the electronic device 100*a* of this embodiment is similar to the previous embodiment. The difference between the two is that the first sliding member 133*c* of the linkage assembly 131*a* of this embodiment is connected to the first casing 112*a* of the first body 110*a* to lead the first body 110*a* to slide relative to the center axis LA of the linkage assembly 131*a* and the second body 120*a*. The second sliding member 133*d* is connected to the second casing 122*a* of the second body 120*a* to lead the second body 120*a* to slide relative to the first body 110*a*. The first function module 111*a* is fixedly disposed on the first casing 112*a*, and the second function module 121*a* is fixedly disposed on the second casing 122*a*. The first bracket 137*c* includes a slot 1372*c* extending in a direction parallel to the sliding axis L31, and the second bracket 137*d* includes a slot 1372*d* extending in a direction parallel to the sliding axis L31. The slots 1372*c*, 1372*d* are formed on the components 1371*c*, 1371*d*.

The edge 116*a* of the first outer surface 113*a* is an end of the first casing 112*a*. The edge 126*a* of the second outer surface 123*a* is an end of the second casing 122*a*. A fastener (not shown) passes through the slot 1372*c* to connect the first bracket 137*c* to the first casing 122*a*, and another fastener (not shown) passes through the slot 1372*d* to connect the second bracket 137*d* to the second casing 122*b*. When the electronic device 100*a* switches between the first status M1 and the second status M2, the first body 110*a* (the first casing 112*a*) rotates relative to the second body 120*a* with the main axis L11 as the axis, and is led by the first sliding member 133*c* to slide relative to the first bracket 137*c* along the sliding axis L31. The second body 120*a* (the second casing 122*a*) rotates relative to the first body 110*a* with the main axis L12 as the axis, and is led by the second sliding member 133*d* to slide relative to the second bracket 137*d* along the sliding axis L32. The fasteners slide in the slots 1372*c*, 1372*d*. The electronic device 100*a* of this embodiment has similar effect to the previous embodiment, and is not repeated herein.

The movement way of the first body 110, 110*a* and the second body 120, 120*a* of the electronic device 100, 100*a* is not limited to the above embodiments. For example, in an embodiment not shown, the pivot module 130, 130*a* may only include the linkage assembly 131 and the first driving assembly 1301 (i.e., the first transmission wheel, the first sliding member, the first rope, the first driven member, and the first adjustment member). When the electronic device 100, 100*a* switches between the first status M1 and the second status M2, the first body 110, 110*a* may move relative to the second body 120, 120*a* through the first driving assembly 1301 in any way of the above embodiments, while the second body 120, 120*a* may only be driven by the linkage assembly 131 to rotate relative to the first body 110, 110*a*. That is, only the first outer surface 113, 113*a* may move towards the second outer surface 123, 123*a*, while the second outer surface 123, 123*a* does not move towards the first outer surface 113, 113*a*.

In summary, the first body of the electronic device of the disclosure is connected to the linkage assembly of the pivot module. When the first body rotates, the first body leads the first transmission wheel to rotate through the first driven member and the linkage assembly, and the first transmission wheel drives the first sliding member to slide through the first rope. Thereby, at least part of the first body connected to the first sliding member slides relative to the center axis of the linkage assembly while the first body rotates relative to the second body, to improve the convenience of using the electronic device.

What is claimed is:

1. An electronic device, comprising:
- a first body;
- a second body, the first body is pivotally connected to the second body; and
- at least one pivot module, wherein each of the at least one pivot module comprises:
  - a first transmission wheel;
  - a linkage assembly, connected to the first body and the second body;
  - a first sliding member, connected to the first body and linked to the first transmission wheel;
  - a first driven member, connected to the first transmission wheel and the linkage assembly; and
  - a first rope, connected to the first sliding member and the first transmission wheel,
- the rotation of the first body relative to the second body leads the linkage assembly and the first driven member to move, thereby driving the first transmission wheel to rotate, and the rotation of the first transmission wheel relative to the first rope drives the first sliding member and at least a part of the first body to move relative to a center axis of the linkage assembly.

2. The electronic device according to claim 1, wherein the first body comprises a first function module and a first casing, the first function module is slidably connected to the first casing, the first sliding member is connected to the first function module, and is adapted to lead the first function module to slide relative to the first casing.

3. The electronic device according to claim 2, wherein when the electronic device is in a first status, a projection of the first function module to the first casing is completely located on the first casing, and when the electronic device is in a second status, a projection of the first function module to the first casing is partially located on the first casing.

4. The electronic device according to claim 2, wherein a distance between an end of the first function module and an end of the first casing when the electronic device is in a first status is smaller than a distance between the end of the first function module and the end of the first casing when the electronic device is in a second status.

5. The electronic device according to claim 1, wherein the first body comprises a first function module and a first casing, the first function module is disposed at the first casing, the first sliding member is connected to the first casing, and is adapted to lead the first body to slide relative to the second body.

6. The electronic device according to claim 1, wherein the linkage assembly comprises a first shaft, a second shaft and a linkage portion, the first shaft is linked to the first body, the second shaft is linked to the second body, the linkage portion comprises two main shaft gears and a linkage gear, the two main shaft gears are respectively sleeved on the first shaft and the second shaft, the linkage gear is disposed between the two main shaft gears and engages with the two main shaft gears.

7. The electronic device according to claim 6, wherein the linkage assembly comprises a first bracket and a second bracket, the first bracket is connected to the first body, the second bracket is connected to the second body, the first shaft is connected to the first bracket, and the second shaft is connected to the second bracket.

8. The electronic device according to claim 6, wherein the first driven member comprises a plurality of gears engaging with each other, the linkage assembly comprises a connecting member and a first rack structure, the first shaft and the second shaft are movably sleeved on the connecting member, the first rack structure is formed on the connecting member, one of the gears is connected to the first transmission wheel, and another of the gears engages with the first rack structure.

9. The electronic device according to claim 1, wherein each of the at least one pivot module further comprises a first adjustment member, the first rope is connected to the first sliding member and the first adjustment member.

10. The electronic device according to claim 1, wherein each of the at least one pivot module further comprises a second transmission wheel, a second sliding member, a second driven member and a second rope, the second driven member is connected to the second transmission wheel and the linkage assembly, the second sliding member is connected to the second body and linked to the second transmission wheel, the second rope is connected to the second sliding member and the second transmission wheel.

11. The electronic device according to claim 10, wherein the rotation of the first body relative to the second body leads the linkage assembly to move, thereby driving the second body to rotate relative to the first body, and leads the second driven member to drive the second transmission wheel to rotate, the rotation of the second transmission wheel relative to the second rope drives the second sliding member and at least part of the second body to slide relative to the first body.

12. The electronic device according to claim 10, wherein the second body comprises a second function module and a second casing, the second function module is slidably connected to the second casing, the second sliding member is connected to the second function module, and is adapted to lead the second function module to slide relative to the second casing.

13. The electronic device according to claim 12, wherein when the electronic device is in a first status, a projection of the second function module to the second casing is completely located on the second casing, when the electronic device is in a second status, a projection of the second function module to the second casing is partially located on the second casing.

14. The electronic device according to claim 12, wherein a distance between an end of the second function module and an end of the second casing when the electronic device is in a first status is smaller than a distance between the end of the second function module and the end of the second casing when the electronic device is in a second status.

15. The electronic device according to claim 10, wherein the second body comprises a second function module and a second casing, the second function module is disposed at the second casing, the second sliding member is connected to the second casing, and is adapted to lead the second body to slide relative to the first body.

16. The electronic device according to claim 10, wherein the linkage assembly comprises a first shaft, a second shaft, a linkage portion, a connecting member and a second rack structure, the first shaft is linked to the second shaft through the linkage portion, the second driven member comprises a plurality of gears engaging with each other, the first shaft and the second shaft are movably sleeved on the connecting member, the second rack structure is formed on the connecting member, one of the gears is connected to the second transmission wheel, another of the gears engages with the second rack structure.

17. The electronic device according to claim 10, wherein each of the at least one pivot module further comprises a second adjustment member, the second rope is connected to the second sliding member and the second adjustment member.

18. The electronic device according to claim 1, further comprising a linkage rod, the at least one pivot module comprises two pivot modules, the linkage rod is connected to the two pivot modules.

* * * * *